United States Patent [19]

Lee

[11] Patent Number: 5,318,240
[45] Date of Patent: Jun. 7, 1994

[54] REEL DRIVING CLUTCH OF MAGNETIC RECORDING/PLAYBACK SYSTEM

[75] Inventor: Weon K. Lee, Seoul, Rep. of Korea

[73] Assignee: Goldstar Co., Ltd., Seoul, Rep. of Korea

[21] Appl. No.: 932,950

[22] Filed: Aug. 21, 1992

[30] Foreign Application Priority Data

Aug. 21, 1991 [KR] Rep. of Korea ............... 14424/1991

[51] Int. Cl.$^5$ ............................................. G11B 15/32
[52] U.S. Cl. .................................................. 242/201
[58] Field of Search ............... 242/200, 201, 202, 204, 242/206, 208, 209, 210; 360/85, 95, 96.1, 96.2, 96.3; 192/56 F, 58 B

[56] References Cited

U.S. PATENT DOCUMENTS 3,772,469 11/1973 Johnson ..................... 242/206 X
3,912,195 10/1975 Yamamoto ..................... 242/201

FOREIGN PATENT DOCUMENTS 60-87454 5/1985 Japan ..................... 242/206
729624 5/1980 U.S.S.R. ..................... 242/201

*Primary Examiner*—Daniel P. Stodola
*Assistant Examiner*—John P. Darling

[57] ABSTRACT

A reel driving clutch for transmitting power to a reel of a magnetic recording/playback system such as a VCR and a DAT. The clutch comprises a shaft fixed to a base plate of the system, a disk rotatably mounted on the shaft to which power from an idler is transmitted, a reel body rotatably mounted on the shaft and placed on the disk, and viscous fluid contained between the disk and the reel body, thereby causing torque of the disk to be transmitted to the reel body via the viscous fluid. The clutch causes a take up reel to be lightened and miniaturized and improves tape running stability.

8 Claims, 5 Drawing Sheets

REEL DRIVING CLUTCH OF MAGNETIC RECORDING/PLAYBACK SYSTEM

BACKGROUND OF THE INVENTION

1. Field of the Invention

The present invention relates to a reel driving clutch of magnetic recording/playback system such as a VCR (video cassette tape recorder) and DAT (digital audio cassette recorder), and more particularly to a reel driving clutch for transmitting power to a reel of the magnetic recording/playback system which uses viscous fluid, as means for transmitting power, and is contained between a disk and a reel body in order to improve the torque property and stability of the reel body and assembling simplicity of the clutch, and to miniaturize the clutch.

2. Description of the Prior Art

Referring to FIG. 1, there is shown a tape traveling system in a conventional deck of magnetic recording/playback system. In the tape traveling system, a tape 3 which is supplied from a supply reel 1 is wound around a take up reel 2 via a rotating head drum 4 by being pulled by a capstan shaft 5 and a pinch roller 6.

In the magnetic recording/playback system shown in the drawing, in order to obtain a stable picture, the capstan shaft 5 must be rotated by being in contact with the pinch roller 6 so that the tape 3 which is in contact with the rotating head drum 4 is transferred at a uniform speed.

In the tape traveling system, the linear velocity (Vc) of the tape 3 which is transferred between the capstan shaft 5 and the pinch roller 6 is expressed by the following expression:

$$Vc = Wc \times Rc$$

where Rc is a radius of the capstan shaft 5 which is a fixed value and Wc is a circumferential speed of the capstan shaft 5. Accordingly, if the circumferential speed of the capstan shaft 5 is uniformly maintained, the linear velocity of the tape 3 can be uniformly maintained.

Also, the traveling linear velocity (Vt) of the tape 3 which is wound on the take up reel 2 is expressed by the following expression:

$$Vt = Wt \times Rt$$

where Wt is a circumferential speed of the take up reel 2 and Rt is a variable working radius of the take up reel 2. While the circumferential speed Wt of the take up reel 2 can be controlled uniformly, the variable working radius Rt of the take up reel 2 is changed according to the amount of the tape 3 being wound on the take up reel 2.

On the other hand, since the variable working radius Rt of the take up reel 2 is changed in the range of a Rmax to a Rmin in response to the amount of the tape wound on the take up reel 2 as shown in the drawing, the linear velocity Vt of the tape 3 on the take up reel 2 is continuously changed.

Accordingly, since the linear velocity Vt of the tape 3 on the take up reel 2 is continuously changed in response to the amount of the tape 3 on the take up reel 2, the linear velocity Vt of the tape 3 on the take up reel 2 does not coincide with the linear velocity Vc on the capstan shaft 5 so that the tape 3 can not be transferred at a uniform speed.

Therefore, if the circumferential speed Wc of the capstan shaft 5 is maintained at a given speed and the circumferential speed Wt of the take up reel 2 is maintained at a slightly faster speed than the rotational speed Wc so as to transfer the tape 3 at a uniform velocity, a torque for pulling the tape 3 on the take up reel 2 becomes higher than a torque for transferring the tape 3 on the capstan shaft 5 at a fixed linear velocity as the tape 3 is wound on the take up reel 2.

At this time, since a torque difference occurs between the capstan shaft 5 and the take up reel 2, the take up reel 2 is slipped in response to the torque difference in order to compensate for the torque difference. Consequently, a linear velocity Vt of the tape on the take up reel 2 is maintained uniformly so that the tape 3 is transferred at a uniform velocity.

As mentioned above, a reel driving clutch for transmitting power to a reel is a device which causes the take up reel 2 to slip to compensate for the torque difference occurring in the tape.

Referring to FIG. 2, there is shown a conventional take up reel of a magnetic recording/playback system which has the above-mentioned reel clutch.

As shown in the drawing, the known reel driving clutch is constructed as will be described hereinafter. A bush 12 is fixedly inserted in a hole formed at a base plate 11 of magnetic recording/playback system. A shaft 13 is mounted in the bush 12. A disk 15 having an upward extending boss 15' at a central portion thereof and brake teeth 15" at its circumferential edge is rotatably mounted on the shaft 13.

The disk 15 is provided with a compression spring 16 and a washer 17 on the boss 15' thereof. Also, a support wheel 18 having gear teeth at its circumferential edge which is adapted to transmit power is rotatably mounted on the boss 15' of the disk 15 to be in contact with the washer 17.

The support wheel 18 is provided with a felt 19 at an upper surface thereof. A reel body 20 is rotatably mounted on an upper end of the boss 15' of the disk 15 in state of being in contact with the felt 19.

The reel body 20 is provided with a compression spring 21 thereon. A collar 22 is mounted on the compression spring 21. A cap 23 is rotatably mounted in a boss 20' of the reel body 20 and disposed on the collar 22. A washer 24 is fixed to the upper end of the shaft 13 and engaged with the cap 23. In the drawing, reference numeral 14 is a reflecting mirror.

Operation of the above known take up reel of the magnetic recording/playback system will be described as follows.

The take up reel 2 is driven such that the support wheel 18 is rotated by torque transmitted via an idler means adapted to transmit power (not shown). As the support wheel 18 is rotated, torque of the support wheel 18 is transmitted to the reel body 20 by being in contact with the felt 19 which is interposed between the support wheel 18 and the reel body 20 and biased upwardly by the compression spring 16. Consequently, the collar 22 mounted on the reel body 20 is rotated together with the reel body 20 so that a hub of the cassette tape is rotated by the collar 22 inserted therein, thereby allowing the tape 3 to be wound on the hub.

At this time, if the circumferential speed Wc of the capstan shaft 5 is maintained at a given speed and the circumferential speed Wt of the take up reel 2 is maintained at a slightly faster speed than the circumferential speed Wc so as to transfer the tape 3 at a uniform velocity, the tape 3 which is transferred between the capstan shaft 5 and the pinch roller 6 is normally wound on the take up reel 2 when an amount of the tape 3 wound around the take up reel 2 is small. On the other hand, when an amount of the tape 3 wound around the take up reel 2 is large, a torque for pulling the tape 3 on the take up reel 2 becomes higher than a torque for transferring the tape 3 between the capstan shaft 5 and the pinch roller 6 so that torque difference occurs in the tape 3. Accordingly, the reel body 20 slips on the felt 19, thereby causing a torque loss between the disk 15 and the reel body 20.

Therefore, since the tape 3 transferred by the capstan shaft 5 and the pinch roller 6 and the tape 3 wound around the take up reel 2 are maintained at the same linear velocity with each other, the tape 3 being in contact with the rotating head drum 4 can be transferred at the uniform linear velocity. Thus, a required function of the reel driving clutch for transmitting power to a reel can be obtained.

However, the above-mentioned known reel clutch which transmits power to the reel body 20 by a mechanical friction between the felt 19 and the reel body 20 has disadvantages as follows.

First, the felt 19 which is usually made of wool etc. is sensitive to temperature and humidity so that the felt changes highly in its physical property.

Second, since the reel driving clutch uses a transmission by friction between solid bodies, the solid bodies are severely worn down after being used for a long time, thereby causing torque stability to be decreased.

Third, it is required to have several additional components such as the felt 19, the support wheel 18, the washer 17 and the compression spring 16 in order to provide the friction between the bodies. Thus, the reel driving clutch intricate and the take up reel 2 becomes increases in height.

Fourth, it is difficult to maintain a hub guide surface of the reel body 20 at a fixed height due to physical property of the felt 19 and the spring 16. Thus, the reel driving clutch must have an additional height adjusting means.

Finally, it is difficult to machine the reel driving clutch to accommodate the felt 19 and the spring 16 and to maintain stable torque.

SUMMARY OF THE INVENTION

Therefore, an object of the invention is to provide a reel driving clutch for transmitting power to a reel of magnetic recording/playback system which does not require components such as a felt, a support wheel and a spring used in the known reel driving clutch and uses viscous fluid contained between a reel body and a disk instead of the felt.

In accordance with the present invention, the object mentioned above can be accomplished by providing a reel driving clutch for transmitting power to a reel of magnetic recording/playback system comprising: a shaft fixed to a base plate of the system; a disk rotatably mounted on the shaft to which power from an idler is transmitted; a reel body rotatably mounted on the shaft and placed on the disk; and viscous fluid contained between the disk and the reel body, thereby causing torque of the disk to be transmitted to the reel body via the viscous fluid.

The disk has a sealing portion at an upper surface thereof and the reel body has a sealing portion corresponding to the sealing portion of the disk, thereby preventing the viscous fluid between the disk and the reel body from leaking.

According to the reel driving clutch of the present invention constructed as mentioned above, as the disk is rotated by power transmission of an idler, rotational force of the disk is transmitted to the reel body by being in contact with viscous fluid. When traveling linear velocity of tape on a capstan shaft is different from that on a take up reel so that torque difference occurs in the tape, the reel body slips on the disk by the viscous fluid, thereby compensating the torque difference and thus causing the tape to be transferred at a uniform speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects, features and advantages of the invention will become more apparent upon a reading of the following detailed description taken in conjunction with the accompanying drawings which are given by way of illustration only, and thus are not limitative of the present invention, and in which.

DESCRIPTION OF THE PREFERRED EMBODIMENTS

Figure 1:
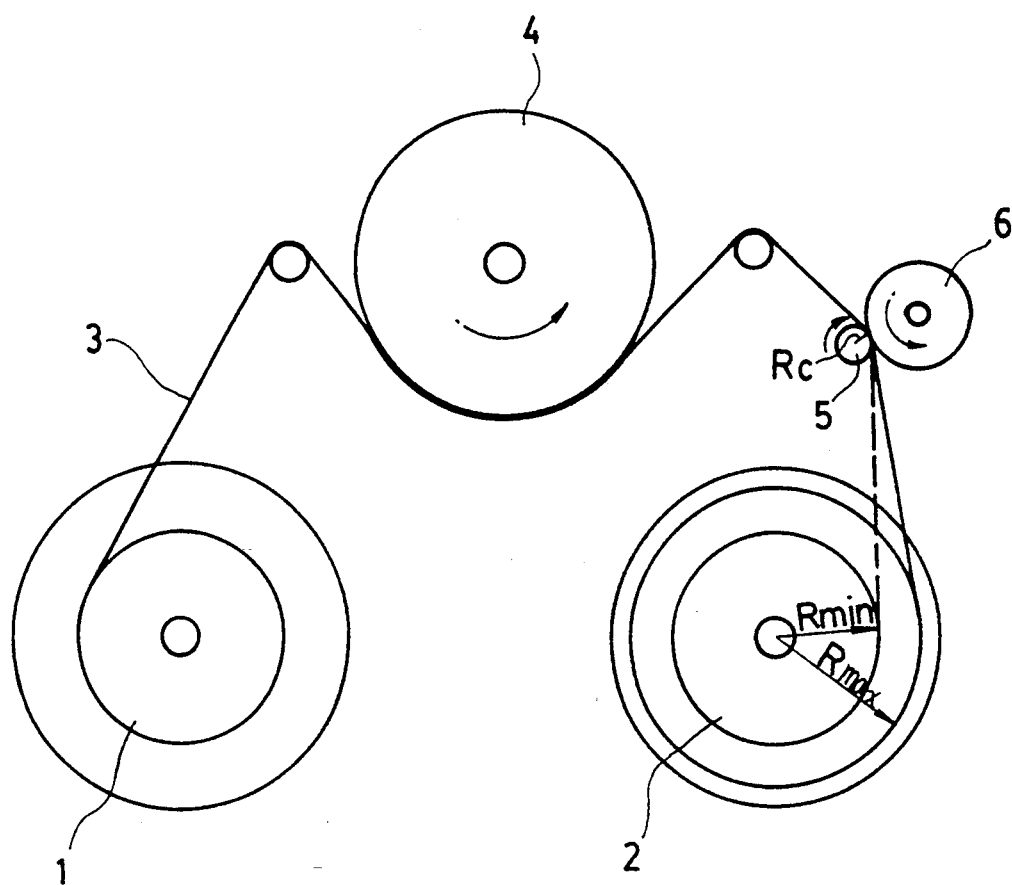
FIG. 1 is a schematic view showing a tape traveling system of known magnetic recording/playback system.

A reel driving clutch for transmitting power to a reel of magnetic recording/playback system according to the present invention will now be described by referring to FIGS. 3 to 6 in the accompanying drawings.

As illustrated in the drawings, the reel driving clutch of magnetic recording/playback system according to the invention is constructed as will be described hereinafter.

A bush 31 is fixedly inserted in a hole formed at a base plate 30 of the magnetic recording/playback system and is provided with a shaft 32 therein. A disk 34 has at a central portion thereof an upward extending boss 37 provided with a through hole and at a circumferential edge thereof teeth 36. The disk 34 is rotatably mounted on the shaft 32 through the through hole thereof.

The disk 34 is provided with an annular depression for containing viscous fluid 40 at an upper surface thereof and sealing portion 39 at a circumferential surface of the annular depression. A reel body 41 is mounted on the boss 37 of the disk 34 and mated with the disk 34 so that the reel body 41 can be rotated about the shaft 32 together with the disk 34. The reel body 41 is provided at a central portion thereof with an upwardly extending boss 42 and at a lower surface thereof a sealing portion 43 corresponding to the sealing portion 39 formed at the upper surface of disk 34, thereby preventing the viscous fluid 40 contained in the annular depression of disk 34 from leaking between the disk 34 and the reel body 41.

A compression spring 44 is inserted on the boss 42 of the reel body 41 and placed on the upper surface of reel body 41. Also, a collar 45 is mounted on the upper end of the boss 42 and engaged with the upper end of the spring 44. A cap 46 is fixedly mounted in the boss 42 at a downwardly extending cylinder portion thereof and covers the collar 45 at a radial flange portion thereof. A washer 47 is fixed to the upper end of the shaft 32 to prevent the components interposed between the base plate 30 and the washer 47 from being dismantled.

As material of the viscous fluid 49, various kinds of materials, for example, grease including gel and liquid materials may be used.

It is preferable to set a clearanced between the sealing portion 39 of the disk 34 and the sealing portion 43 of the reel body 41 so that fluid friction occurs between the sealing portions 39 and 43.

The boss 37 of the disk 34 is formed with an annular shoulder 38 for supporting the reel body 41 so that a gap having a width corresponding to the height of the annular shoulder 38 is maintained between the disk 34 and the reel body 41.

Figure 2:
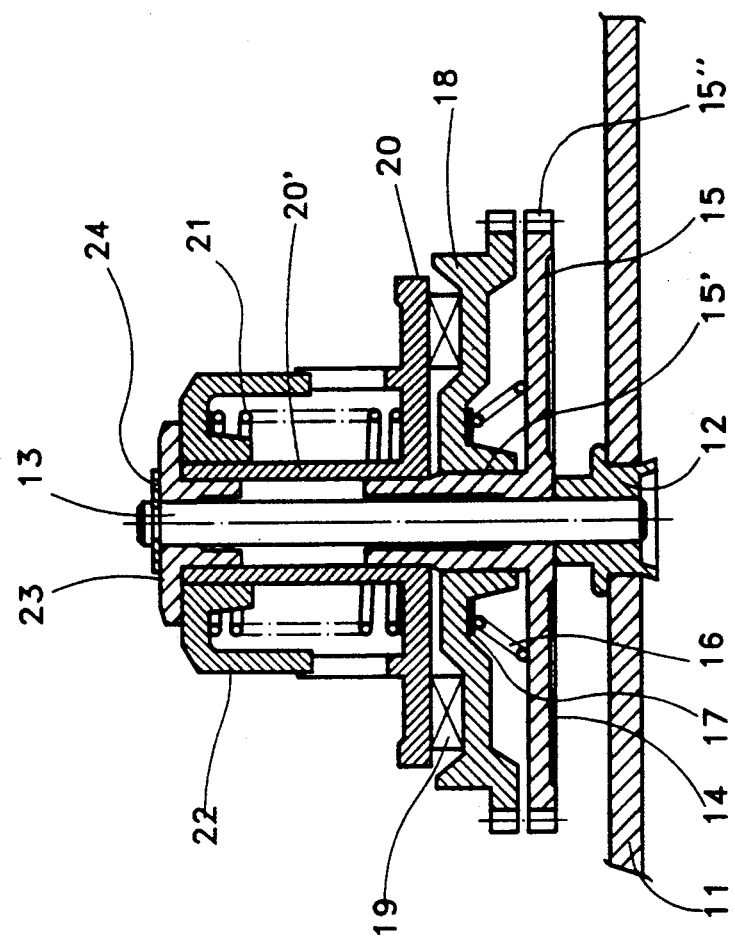
FIG. 2 is a cross sectional view of a take up reel of known magnetic recording/playback system.

Since the reel driving clutch according to the invention does not require a support wheel, the disk 34 has a gear 35 for transmitting power and brake teeth 36 respectively formed at an upper portion and a lower portion of an outer circumferential surface thereof, contrary to the gear teeth formed at the circumferential edge of the support wheel 18 and the brake teeth 15" formed at the circumferential edge of the disk 15 shown in FIG. 2.

Figure 3:
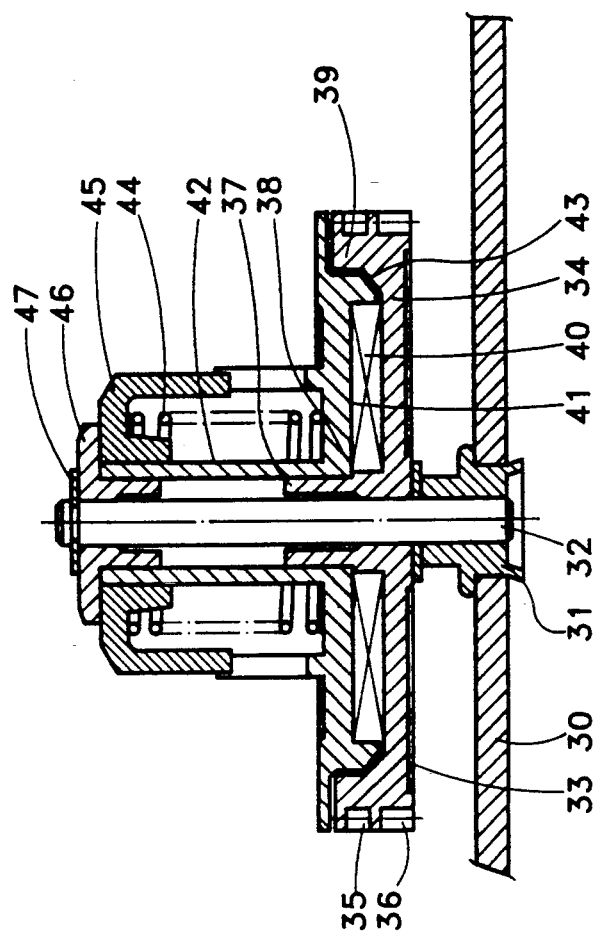
FIG. 3 is a cross sectional view of a take up reel having a reel driving clutch of magnetic recording/playback system according to the present invention.
Figure 4:
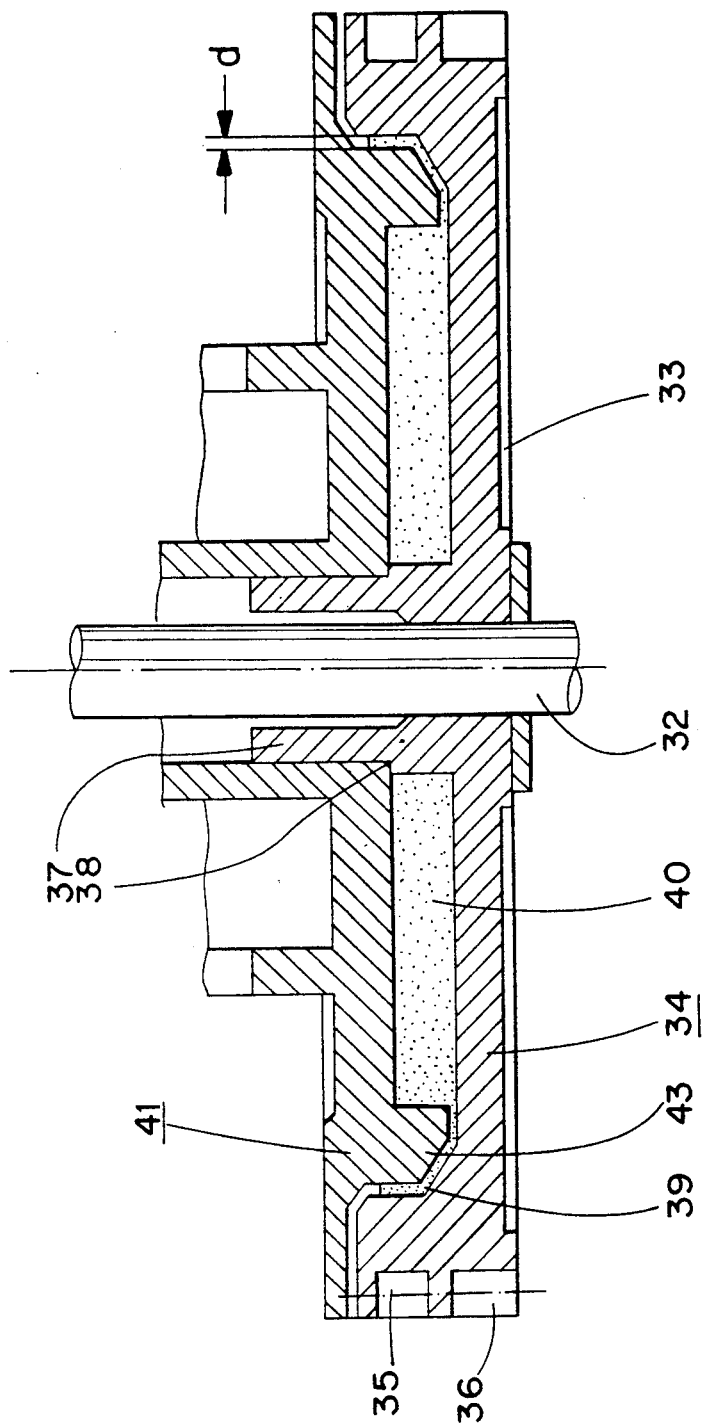
FIG. 4 is an enlarged sectional view of the reel driving clutch shown in FIG. 3.
Figure 5:
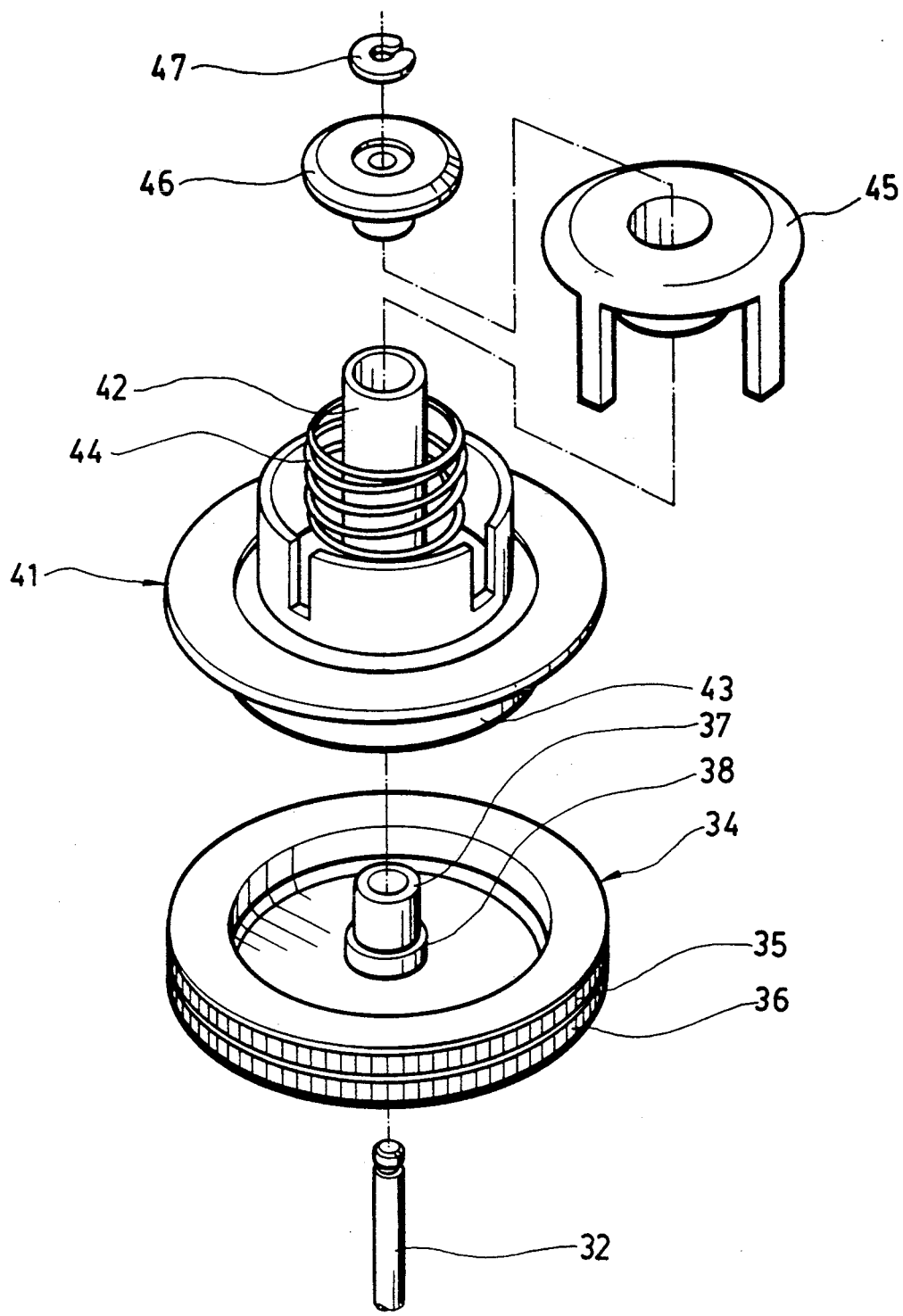
FIG. 5 is an exploded view of the take up reel shown in FIG. 3.

In FIGS. 3 and 4, reference numeral 33 denotes a reflecting mirror.

Operation of the reel driving clutch of magnetic recording/playback system according to the present invention will be described hereinafter.

The disk 34 is rotated by the torque transmitted from an idler means (not shown). As the disk 34 is rotated, the torque is transmitted to the reel body 41 through the viscous fluid 40 so that the reel body 41 is rotated. On the other hand, as the disk 34 is rotated, fluid friction occurs between the disk 34 and the reel body 41 by the viscous fluid 40 so that the torque of the disk 34 is transmitted to the reel body 41 by the fluid friction, thereby causing the reel body 41 to be rotated.

Furthermore, the rotating motion of the reel body 41 causes the collar 45 mounted on the boss 42 of the reel body 42 to be rotated. Accordingly, a hub of a cassette (not shown) inserted on the collar 45 is rotated in response to the rotation of the collar 45 so that a tape is wound around the hub.

At this time, when the circumferential speed Wc of the capstan shaft 5 is maintained at a given speed and the circumferential speed Wt of the take up reel 2 is maintained at a slightly faster speed than the circumferential speed Wc so as to transfer the tape 3 at a uniform velocity. On the other hand, when an amount of the tape 3 wound around the take up reel 2 is large, a torque for pulling the tape 3 on the take up reel 2 becomes higher than a torque for transferring the tape 3 on the capstan shaft 5 as the amount of tape wound around the take up reel 2 becomes larger.

Accordingly, when the amount of the tape 3 wound around the take up reel 2 is small, the tape 3 which is transferred between the capstan shaft 5 and the pinch roller 6 is normally wound on the take up reel 2. On the other hand, as the amount of the tape 3 wound around the take up reel 2 becomes larger, a torque for pulling the tape 3 on the take up reel 2 becomes higher than the torque for transferring the tape 3 between the capstan shaft 5 and the pinch roller 6 so that the reel body 42 slips on the disk 34 by the viscous fluid 40, thereby causing a torque loss between the disk 15 and the reel body 20.

Therefore, since the tape 3 transferred by the capstan shaft 5 and the pinch roller 6 and the tape 3 wound around the take up reel 2 are maintained at the same linear velocity with each other, the tape being in contact with the rotating head drum 4 can be transferred at the uniform linear velocity. Thus, a required function of the reel driving clutch according to the invention can be obtained.

As apparent from the above description, the reel driving clutch for transmitting power to a reel of magnetic recording/playback system according to the invention uses, as means for transmitting power, viscous grease etc. that is more stable in temperature and humidity than a felt used in a known reel driving clutch. Accordingly, the reel driving clutch according to the invention can be strongly resistive to temperature and humidity.

Also, since the reel body is rotated by being in contact with not a felt but viscous fluid contained between the reel body and the disk while the disk is rotated, mechanical abrasion of the clutch is substantially decreased, thereby causing a long term stability of torque transmission to be improved.

Moreover, since the reel driving clutch is constructed such that a felt, a supporting wheel, washer and a compression spring used in a known reel driving clutch are removed and the disk of the clutch is in contact with the reel body, the reel driving clutch is simplified in structure and also it is possible to adjust the height of a guide surface of the hub without separating components for setting height and to manage components for maintaining uniform torque easily. Furthermore, the clutch has excellent high speed running stability and thus excellent stability in a high speed searching mode.

Therefore, the reel driving clutch according to the present invention causes a VCR and a DAT to be lightened and miniaturized and improves the assembling easiness, reliance and competitive power of products.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A reel driving clutch for transmitting power to a reel of magnetic recording/playback system comprising:
   a shaft fixed to a base plate of the system;
   a disk rotatably mounted on the shaft to which power from an idling means is transmitted, the disk having an annular shoulder with a given height at a lower side of a boss thereof;

a reel body rotatably mounted on the shaft and placed on the disk, the reel body being supported on the annular shoulder of the disk, a gap corresponding to the height between the disk and the reel body being provided; and viscous fluid contained between the disk and the reel body, thereby causing torque of the disk to be transmitted to the reel body via the viscous fluid.

2. The reel driving clutch according to claim 1, in which said viscous fluid is grease.

3. The reel driving clutch according to claim 1, in which said disk has a sealing portion at an upper surface thereof and said reel body has a sealing portion adjacent to the sealing portion of the disk, thereby preventing the viscous fluid between the disk and the reel body from leaking.

4. The reel driving clutch according to claim 1, in which said disk is provided with a gear for transmitting power and brake teeth at a circumferential outer surface thereof.

5. A reel driving clutch for transmitting power to a reel of magnetic recording/playback system comprising:

a shaft fixed to a base plate of the system;

a disk rotatably mounted on the shaft to which power from an idling means is transmitted, the disk having a sealing portion at an upper surface thereof;

a reel body rotatably mounted on the shaft and placed on the disk, the reel body having a sealing portion adjacent to the sealing portion of the disk; and viscous fluid contained between the disk and the reel body, thereby causing torque of the disk to be transmitted to the reel body via the viscous fluid, the disk sealing portion and the sealing portion of the reel body preventing the viscous fluid from leaking from between the disk and the reel body.

6. The reel driving clutch according to claim 5, in which said viscous fluid is grease.

7. A reel driving clutch for transmitting power to a reel of magnetic recording/playback system comprising:

a shaft fixed to a base plate of the system;

a disk rotatably mounted on the shaft to which power from an idling means is transmitted, the disk being provided with a gear for transmitting power and brake teeth at a circumferential outer surface thereof;

a reel body rotatably mounted on the shaft and placed on the disk; and viscous fluid contained between the disk and the reel body, thereby causing torque of the disk to be transmitted to the reel body via the viscous fluid.

8. The reel driving clutch according to claim 7, in which said viscous fluid is grease.

* * * * *